(12) United States Patent
Oster et al.

(10) Patent No.: US 6,613,997 B2
(45) Date of Patent: Sep. 2, 2003

(54) CONTROL DEVICE FOR A JOYSTICK

(75) Inventors: Christoph Oster, Ludenscheid (DE); Martin Wagner, Ludenscheid (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 10/120,618

(22) Filed: Apr. 11, 2002

(65) Prior Publication Data

US 2002/0148715 A1 Oct. 17, 2002

Related U.S. Application Data

(63) Continuation of application No. PCT/EP01/09547, filed on Aug. 18, 2001.

(30) Foreign Application Priority Data

Aug. 25, 2000 (DE) .......................................... 100 41 935

(51) Int. Cl.[7] .............................................. H01H 19/14
(52) U.S. Cl. ...................................... 200/564; 345/184
(58) Field of Search .............................. 200/12, 61.27, 200/61.3, 61.54, 6 A, 564; 307/10.1, 10.8; 345/156–184

(56) References Cited

U.S. PATENT DOCUMENTS

| | | | | |
|---|---|---|---|---|
| 2,924,680 A | * | 2/1960 | Swenson | 200/12 X |
| 3,591,740 A | * | 7/1971 | Kolster | 200/61.27 |
| 4,378,474 A | * | 3/1983 | Olson | 200/12 |
| 4,900,946 A | * | 2/1990 | Williams et al. | 307/10.1 |
| 5,709,219 A | * | 1/1998 | Chen et al. | 345/156 X |
| 6,339,419 B1 | * | 1/2002 | Jolly et al. | 345/156 |
| 6,480,752 B1 | * | 11/2002 | Blume et al. | 345/156 X |

FOREIGN PATENT DOCUMENTS

| | | | | |
|---|---|---|---|---|
| DE | 19712049 A1 | * | 9/1998 | G01D/5/14 |
| EP | 0 549 870 A1 | | 4/1992 | |

* cited by examiner

*Primary Examiner*—J. R. Scott
(74) *Attorney, Agent, or Firm*—Brooks & Kushman P.C.

(57) ABSTRACT

A rotating actuator includes a rotatable control shaft, a manually operated handle connected therewith, and a device for generating a haptic perception when rotating the control shaft. The haptic signal generating device is developed in the form of a mechanical detent assembly including a detent curve and at least one detent element engaging the stop curve. An activating device is allocated to the haptic signal generating device and is actively configured on the detent curve or a detent element. By selecting the activation device an interaction is created between a detent element and the detent curve in order to generate the haptic signal formed by the detent curve. The haptic signal can be enabled or disabled by activating or deactivating the activation device as the control shaft is rotated.

10 Claims, 2 Drawing Sheets

CONTROL DEVICE FOR A JOYSTICK

CROSS-REFERENCE TO RELATED APPLICATIONS

This is a continuation of International Application PCT/EP01/09547, published in German with an international filing date of Aug. 18, 2001.

BACKGROUND OF THE INVENTION

1. Field of the Invention

The present invention relates to an actuator having a rotatable control shaft with a manually operated handle connected thereto and a device for generating a haptic perception signal when rotating the handle, in which the haptic signal generating device is developed in the form of a mechanical detent assembly having an annular body and at least one detent element engaging teeth on an inner surface of the annular body.

2. Background Art

Rotating actuators are used, for example, with data input devices in which a cursor control can be implemented at different menu levels, for example, by rotating the rotating actuator and, where appropriate, by pushing or swiveling the actuator. For example, such a rotating actuator may be part of a joystick. This type of rotating actuator is known from DE 197 12 049 A1. In this known rotating actuator, a drive for generating a haptic signal is coupled with the control shaft. The device is an electric motor which exercises a torque on the control shaft that opposes the rotational motion when applied correspondingly. Varying haptic signals can be provided as a function of the control or activation of the motor, both with respect to the amperage applied to the motor as well as a function of the current setting of the angle of rotation of the control shaft. The actuator also can be operated without controlling the motor and thus without a haptic signal which drives the rotational motion.

Therefore, it is possible that the same rotating actuator can be operated both with and without a predetermined haptic signal or with varying haptic signals as a function of the respective mode of the rotating actuator. This is advantageous compared with those rotating actuators that are provided with a haptic signal generating device in the form of a mechanical latching or notching assembly having an annular body and at least one detent element engaging the inside of the annular body in order to generate a haptic signal when rotating the handle. With this type of mechanical tactile haptic signal generating device, the haptic signal cannot be switched on or off, and, above all, cannot be reversed.

In contrast to the mechanical haptic signal generating devices, which are developed in the form of a mechanical stopping device, the above-mentioned rotating actuator is considered disadvantageous because the zero position of the rotating actuator is relatively soft, and a control vibration can be felt as a result of the load moment when rotating the handle, which the motor necessarily must produce.

SUMMARY OF THE INVENTION

It is an object of the present invention to develop a generic rotating actuator of the aforementioned type having a haptic signal generating device, which operates similar to a mechanical detent assembly, so that the disadvantages mentioned in terms of the above illustrated prior art are avoided.

The foregoing object is realized in the present invention in that an activating device is allocated to the haptic signal generating device, which is designed as an annular body having teeth on an inner surface and at least as one detent element. By selecting the activation device, an interaction is created between a detent element and the annular body in order to generate the haptic signal formed by the teeth of the annular body. The interaction between the detent element and the annular body, and consequently, the haptic signal formed by the teeth of the annular body, can be enabled or disabled by activating or deactivating the activation device as the control shaft is rotated.

The rotating actuator in accordance with the present invention is based on an actuator whose haptic signal generating device is formed similar to a mechanical detent assembly. The result is a precise, predetermined haptic signal that is produced when the control shaft rotates. The rotating actuator also includes an electromagnetically operated activation device. The activation device acts upon at least one of the two detent devices—annular body or detent element—which interact to generate the haptic signal. By activating or deactivating the activation device, the interaction between the annular body and a detent element can be connected or disconnected.

The activation device can be designed, for example, to act upon a detent element to engage the detent element depending on the design of the activation device when activating the annular body to be lifted from the annular body. The activation device may correspondingly also be effectively positioned on the annular body carrying the teeth. With this embodiment, at least one spring pre-loaded stop element engages the teeth of the annular body. The inner surface of the annular body concentrically surrounds the control shaft. Without actuating the activation device, the annular body also is moved corresponding to the rotational motion of the control shaft as a result of the detent element engaging the inside of the annular body as the control shaft rotates so that no haptic signal is perceivable in this mode of the rotating actuator.

Only when selecting the activation device, the annular body carrying the teeth is determined in contrast to a rotational motion of the rotating control shaft, so that subsequently at least one detent element is guided via the teeth of the annular body for generating the desired haptic signal as the control shaft rotates. Such an embodiment has the advantage that undesired motions of the control shaft can be avoided when switching from one haptic signal to another haptic signal, which potentially result from a stop element failing to exactly engage a recess in the inside surface of the annular body. These types of haptic signal related motions of the control shaft are undesirable in many applications.

The rotating actuator in accordance with the present invention thus includes a mechanical connectable and disconnectable haptic perception signal. A further embodiment of the present invention provides that the haptic signal generating device includes one or several additional annular bodies and at least one additional detent element which engages the interior of respective detent curves, in which these additional devices also are allocated to an activation device in order to connect or disconnect the haptic signal. The stopping devices (i.e., annular bodies and detent elements) may also be placed concentrically to each other or provided in different layers above each other, so that such a rotating actuator may include different haptic perception signal generators. Further, it can be provided that each mechanically provided haptic signal generator can be interconnected overlaying either individually or in groups.

In a preferred embodiment, it is provided that the activation device acts upon the annular body, which carries the teeth at the inside surface, and fixes and engages the annular body by friction compared with the rotational movement of the control shaft when activating the activation device. Furthermore, it can be provided that such an annular body, for example, can be fixed by a positive locking gear by means of the activation device and its control compared with a rotational movement of the control shaft.

For example, an electromagnetically activated tension ring, developed in the form of a hose clamp, may serve to produce a friction engaged connection between an annular body carrying the teeth and the activation device. When the activation device is activated, the annular body can be fixed in the tension ring such that the teeth remain in a fixed position compared with a rotational movement of at least one detent element engaging the inner surface of the annular body.

However, another activation device is used in a further development which does not act upon an annular body carrying the teeth, but acts directly upon the control shaft, suitably upon a brake flange, which is connected with the control shaft. By means of this activation device, the rotational motion of the control shaft can be blocked or, if desired, the necessary torque for moving the control shaft can be increased. For example, this additional activation device is able to realize a tactile stop in the event that such a stop is to withstand greater forces. It also is suitable to design this activation device, which acts upon the control shaft, to produce a positive-locking connection between the two elements (i.e., the activation device and the control shaft). Furthermore, there is the option of providing a rotating actuator without a haptic signal generating device or with a haptic signal generating device of a different type solely with an activating device, which directly acts upon the control shaft.

BRIEF DESCRIPTION OF THE DRAWINGS

Additional particularly advantageous embodiments of the present invention will be explained using the embodiment example shown in the drawings.

DETAILED DESCRIPTION OF THE PREFERRED EMBODIMENT(S)

Figure 1:
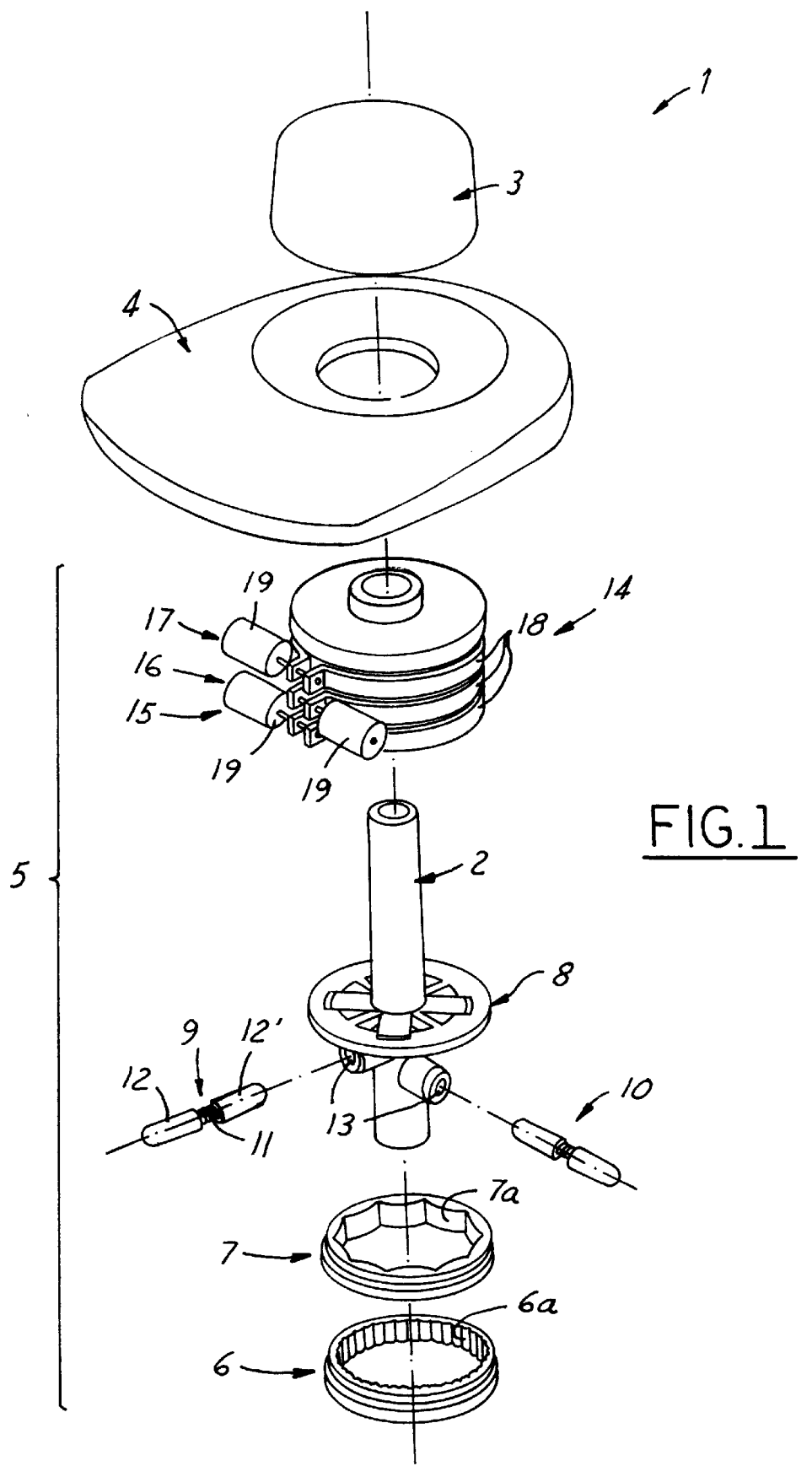
FIG. 1 illustrates an exploded view of the rotating actuator in accordance with the present invention.

Referring now to FIG. 1, a rotating actuator 1 in accordance with the present invention is shown. Rotating actuator 1 includes a rotatable control shaft 2 at the operator end, of which a turning knob 3 is provided as a handle. Control shaft 2 passes through a diaphragm 4 so that the control shaft segments located below turning knob 3 are covered by the diaphragm.

Rotating actuator 1 also includes a haptic perception signal generating device 5. Haptic signal generating device 5 includes, for example, two annular bodies such as detent or stop curve rings 6 and 7 (i.e., latching or notching curve rings), a brake flange 8 connected to control shaft 2, and detent or stop sleeve assemblies 9 and 10. Detent sleeve assemblies 9 and 10 are staggered by 90° and respectively include two detent elements (i.e., latching or notching elements) such as two stop bolts 12 and 12'. Stop bolts 12 and 12' are placed opposite to each other and are supported by a compression spring 11. Stop bolts 12 and 12' together with compression spring 11 are respectively placed in a sleeve-like receptacle 13 of control shaft 2. Detent curve rings 6 and 7 are float-mounted to the rotational movement of control shaft 2.

Haptic signal generating device 5 further includes three activation devices 15, 16, and 17 combined in a clamping bell 14. Activation devices 15, 16, and 17 are developed similar to a tension or clamping ring 18—as shown in FIG. 1 with respect to activation device 15—and an electromagnet 19 for controlling the tension ring. When controlling electromagnet 19, tension ring 18 can be tensioned. The remaining activation devices 16 and 17 are designed correspondingly. Activation devices 15 and 16 with their tension rings 18 surround respective detent curve rings 6 and 7.

Further, it is provided that the inside diameter of tension rings 18 is negligibly larger than the outside diameter of detent curve rings 6 and 7. Actuating electromagnets 19 of activation device 15 and 16 fixes the respective detent curve ring 6 and 7, as the respective tension ring 18 is maintained friction engaged. Clamping bell 14 with its activation devices 15, 16, and 17 is stationary compared with the rotational motion of control shaft 2.

Activation device 17 interacts with brake flange 8 in a corresponding manner so that this activation device 17 increases the torque necessary to cause or to prevent and block the rotational movement of control shaft 2 by actuating its associated electromagnet 19.

Figure 2:
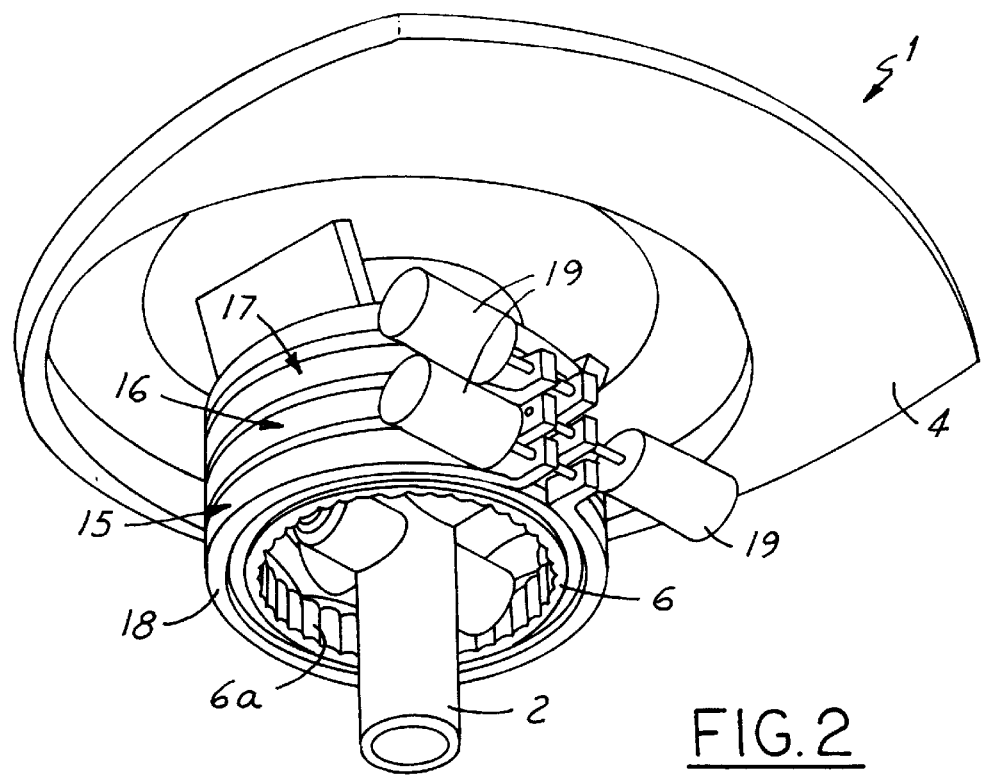
FIG. 2 illustrates the rotating actuator in its mounted condition looking up into the direction of the haptic signal generating device.

When rotating actuator 1 is mounted, two stop bolts 12 and 12', which are diametrically opposed, respectively engage the teeth 6a and 7a of a detent curve ring 6 and 7. This is shown in the lower part of FIG. 2. As control shaft 2 rotates without electromagnet 19 of an activation device 15, 16, and 17 being actuated, the control shaft is rotatable without the haptic signal provided by detent curve rings 6 and 7. When engaging the spring pre-tensioned stop bolts 12 and 12' in the teeth 6a and 7a of the inside surface of a stop detent ring 6 and 7, the bolts and the detent curve rings are jointly moved as control shaft 2 rotates.

When actuating an electromagnet of an activation device, for example, electromagnet 19 of activation device 15, tension ring 18 is closed, so that detent curve ring 6 enclosed by the tension ring is fixed compared with the rotational motion of control shaft 2. When rotating control shaft 2, two stop bolts 12 and 12' are now moved along teeth 6a of detent curve ring 6, so that a tactile rotational motion of the stop bolts occurs corresponding to the teeth 6a contained in detent curve ring 6.

In order to realize a haptic stop, activation device 17 can be so selected that by tensioning the tension ring of this activation device, a rotational motion of control shaft 2 is prevented. Activation devices 15, 16, and 17 can be selected individually or in groups, in order to create varying haptic signals.

Figure 3:
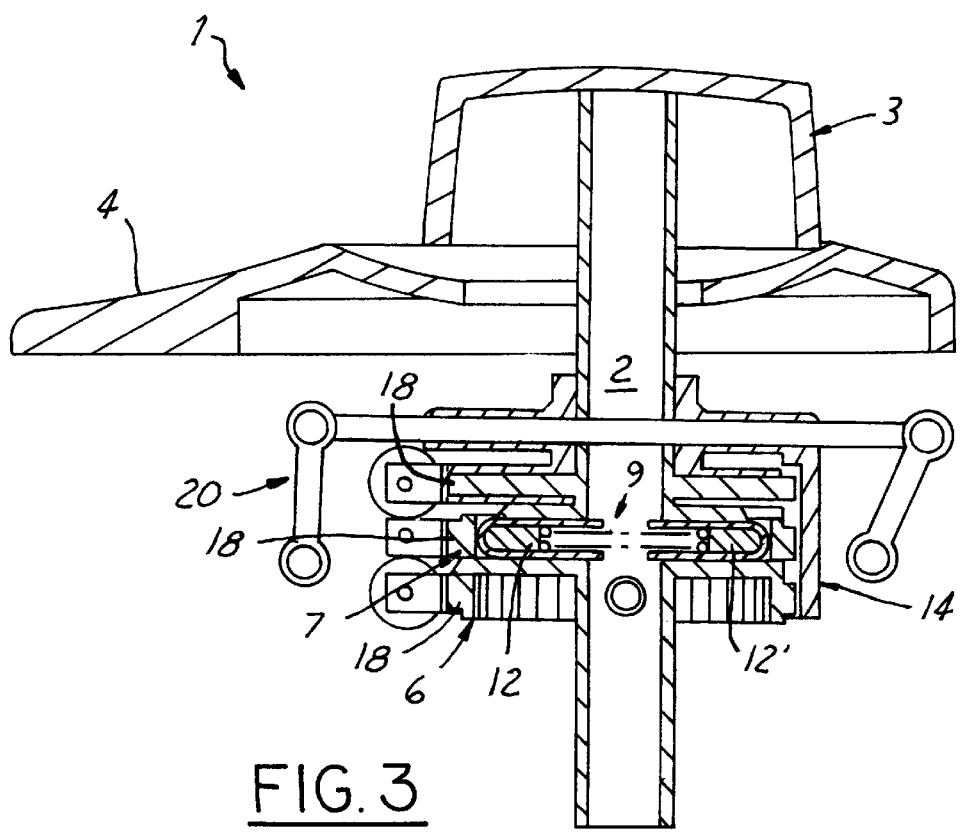
FIG. 3 illustrates a longitudinal section through the rotating actuator placed in a joystick.

FIG. 3 shows a longitudinal section of rotating actuator 1, in that the embodiment of the rotating actuator is part of a joystick, which is not shown in detail. Control shaft 2 and correspondingly also turning knob 3 are rotatable with clamping bell 14 containing activation devices 15, 16, and 17. FIG. 3 shows rotating actuator 1 in its position into which it was swiveled from zero position.

The tactile options offered by rotating actuator 1, which can be realized by simple means, allow the rotating actuator to be part of a joystick, as shown in FIG. 3, without incurring large expenditure, because only a single assembly, i.e., clamping bell 14, is rotated. FIG. 3 symbolically presents a rod assembly 20 via which the rotating motion of control shaft 2 is controlled.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A control device for a joystick, the control device comprising:
   a shaft;
   a handle connected to the shaft for rotating the shaft;
   a mechanical assembly including an annular body and a detent element, wherein the annular body has a series of teeth on an inner surface, the inner surface of the annular body concentrically surrounding and being positioned apart from the shaft, wherein the detent element is fixed to the shaft to rotate therewith;
   wherein the mechanical assembly is operable for generating a haptic perception signal in response to the annular body being fixed in position such that the detent element interacts with, and rotates with respect to, the teeth of the annular body as the shaft rotates; and
   a first activation device operable for being activated to fix the annular body in position such that the detent element interacts with, and rotates with respect to, the teeth of the annular body as the shaft rotates in order to generate the haptic perception signal;
   wherein the first activation device is operable to be deactivated to remove the annular body from being fixed in position such that the haptic perception signal is switched off as the shaft rotates.

2. The control device of claim 1 wherein:
   the detent element engages the teeth of the annular body such that the annular body rotates as the shaft rotates when the first activation device is deactivated.

3. The control device of claim 2 wherein:
   the first activation device fixes the annular body in position using a friction engagement between the first activation device and the annular body.

4. The control device of claim 3 wherein:
   the first activation device includes an electromagnetically controllable tension ring for applying the friction engagement between the first activation device and the annular body.

5. A control device for a joystick, the control device comprising:
   a shaft;
   a handle connected to the shaft for rotating the shaft;
   a first mechanical assembly including a first annular body and a first detent element, wherein the first annular body has a series of teeth on an inner surface, the inner surface of the first annular body concentrically surrounding and being positioned apart from the shaft, wherein the first detent element is fixed to the shaft to rotate therewith;
   wherein the first mechanical assembly is operable for generating a first haptic perception signal in response to the first annular body being fixed in position such that the first detent element interacts with, and rotates with respect to, the teeth of the first annular body as the shaft rotates;
   a first activation device operable for being activated to fix the first annular body in position such that the first detent element interacts with, and rotates with respect to, the teeth of the first annular body as the shaft rotates in order to generate the first haptic perception signal;
   wherein the first activation device is operable to be deactivated to remove the first annular body from being fixed in position such that the first haptic perception signal is switched off as the shaft rotates;
   a second mechanical assembly including a second annular body and a second detent element, wherein the second annular body has a series of teeth on an inner surface, the inner surface of the second annular body concentrically surrounding and being positioned apart from the shaft, wherein the second detent element is fixed to shaft to rotate therewith;
   wherein the second mechanical assembly is operable for generating a second haptic perception signal in response to the second annular body being fixed in position such that the second detent element interacts with, and rotates with respect to, the teeth of the second annular body as the shaft rotates; and
   a second activation device for fixing the second annular body in position upon activation such that the second detent element interacts with, and rotates with respect to, the teeth of the second annular body as the shaft rotates in order to generate the second haptic perception signal, wherein the second activation device removes the annular body from being fixed in position upon deactivation such that the second haptic perception signal is switched off as the shaft rotates.

6. The control device of claim 5 wherein:
   the first and second annular bodies are placed adjacent to one another at different levels with respect to a longitudinal axis of the shaft.

7. The control device of claim 5 further comprising:
   a third activation device operable for acting upon the shaft to influence the rotational movement of the shaft.

8. The control device of claim 7 wherein:
   the first, second, and third activation devices are combined in an assembly.

9. A control device for a joystick, the control device comprising:
   a shaft;
   a handle connected to the shaft for rotating the shaft;
   a mechanical assembly including an annular body and a detent element, wherein the annular body has a series of teeth on an inner surface, the inner surface of the annular body concentrically surrounding and being positioned apart from the shaft, wherein the detent element is fixed to the shaft to rotate therewith;
   wherein the mechanical assembly is operable for generating a haptic perception signal in response to the annular body being fixed in position such that the detent element interacts with, and rotates with respect to, the teeth of the annular body as the shaft rotates;
   a first activation device operable for being activated to fix the annular body in position such that the detent element interacts with, and rotates with respect to, the teeth of the annular body as the shaft rotates in order to generate the haptic perception signal;
   wherein the first activation device is operable to be deactivated to remove the annular body from being fixed in position such that the haptic perception signal is switched off as the shaft rotates; and
   a second activation device operable for acting upon the shaft to influence the rotational movement of the shaft.

10. The control device of claim 9 wherein:
    the shaft includes a brake flange, wherein the second activation device includes an electromagnetically controllable tension ring operable with the brake flange for influencing the rotational movement of the shaft.

* * * * *